H. Flad,
Pile Driver.

No. 95,786. Patented Oct. 12, 1869.

Witnesses
Wm. W. Herthel
Robert Burns

Inventor:
Henry Flad by his
attys
Herthel & Co.

United States Patent Office.

HENRY FLAD, OF ST. LOUIS, MISSOURI, ASSIGNOR TO JAMES B. EADS, OF SAME PLACE.

Letters Patent No. 95,786, dated October 12, 1869.

IMPROVED PILE-DRIVER.

The Schedule referred to in these Letters Patent and making part of the same.

*To all whom it may concern:*

Be it known that I, HENRY FLAD, of St. Louis, in the county of St. Louis, and State of Missouri, have made certain new and useful Improvements in Pile-Drivers; and I do hereby declare the following to be a full and clear description thereof, reference being had to the accompanying drawings, and to the letters of reference marked thereon.

This invention relates to the arrangement of a movable platform between the leaders of a pile-driver, said platform being raised or lowered by proper devices in accordance with the position of the pile.

Said invention relates also to the manner of raising the ram, by friction-wheels, operated to clutch or release from the movable platform aforesaid.

The machine, constructed as now to be described, is especially applicable to obtain short, quick strokes of the ram, and is therefore especially adapted for driving piles in sandy soil.

To enable those herein skilled to make and use my said invention, I will now more fully describe the same, referring herein to the accompanying drawings, of which—

Figure 1:
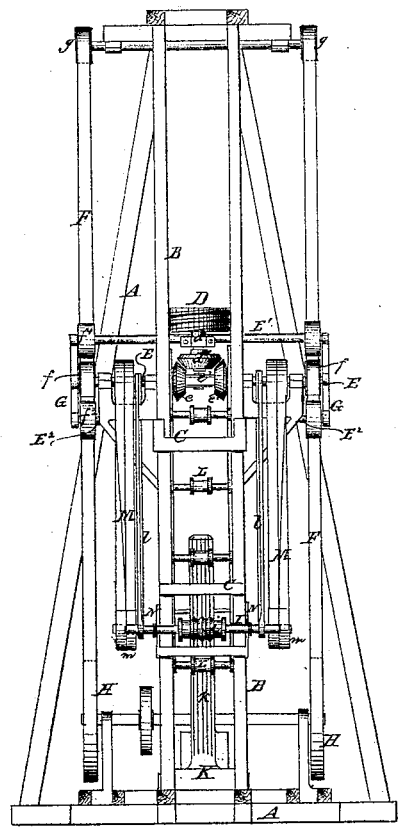
Figure 2:
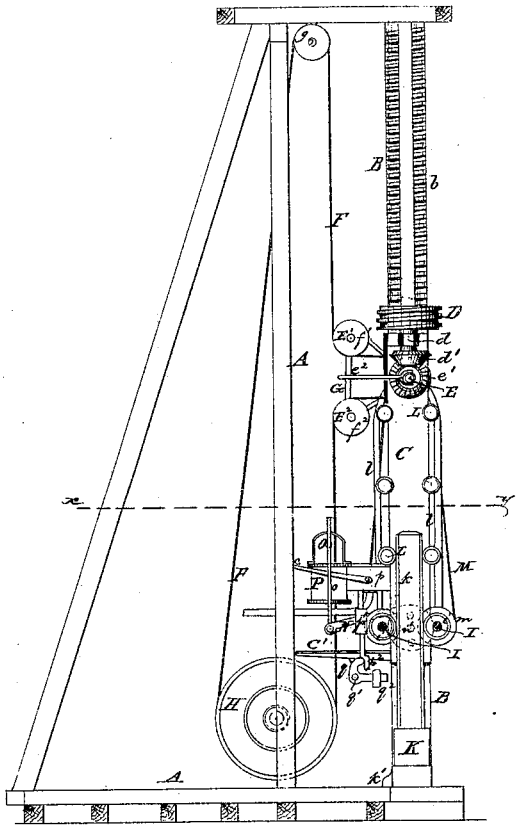
Figure 4:
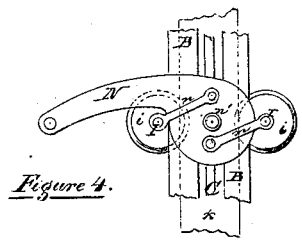
Figure 3:
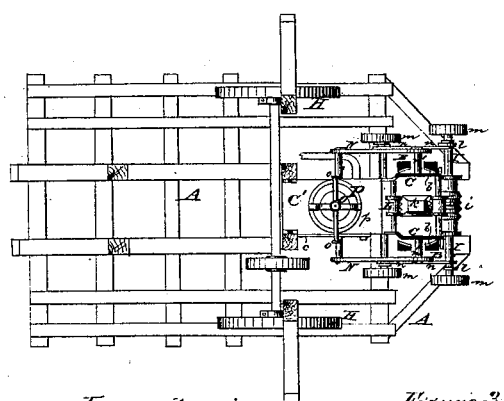

Figure 1 is a front view;
Figure 2 is a central sectional elevation;
Figure 3 is a plan section at line $x\ y$ of fig. 2; and
Figure 4 is a detail elevation of the device for clutching the ram.

The operating-parts of my said pile-driver are supported in a proper frame, A, of the general form indicated in the figure.

To said frame the uprights or leaders B are connected, between which the travelling-frame C is arranged, which, at its base, has the platform C'.

In order to move the frame and platform C and C' up or down, as may be desirable, I have arranged the leaders B with screw-threads, $b$, in engagement with which is the screw-wheel D, which has a bearing and attachment to the frame C.

The shaft $d$, of said wheel, is rotated by the bevel-wheel $d'$, operated in one or the reversed direction by the bevel-wheels $e\ e^1$ respectively, upon the shaft E.

A lever, $e^2$, is used by the operator, to move one or the other of said wheels $e\ e^1$ into engagement with the wheel $d'$, thus giving an upward or downward movement to the frame C.

The shaft E has proper bearings on the frame C, and at its ends carries the pulleys $f$.

A triangular bracket, G, connects the shaft E with the shafts $E^1$ and $E^2$, these being also further supported by arms projecting from said frame C, in any desired manner.

On said shafts $E^1$ and $E^2$ respectively, are the pulleys $f^1$ and $f^2$, and the bands F passing about said pulleys and the pulleys $f$, and over the pulley $g$, at the top of the frame A, are driven by the driving-wheels H, which in turn are rotated by the power-source, in any manner desired. In this wise the wheel D is driven, whatever may be the position of the frame C.

At the lower end of the frame C, I arrange, in proper bearings, the shafts I, whereon are the grooved wheels $i$.

Said grooved wheels, by friction, act, when brought to a proper engagement, upon the shank $k$, of the ram K, the shank $k$ being grooved in a manner corresponding to that of the wheels $i$.

The wheels $i$, and their shafts, are suspended by the hangers $l$ from the shaft E, said hangers being arranged to allow said shafts I a small vibration away from the leaders B.

The shafts I, and wheels $i$, are rotated by pulleys $m$ and bands M, from the pulleys $m'$, upon the shaft E, the two shafts I turning in opposite directions.

When, therefore, the wheels $i$ clutch the shank $k$ of the ram, by their rotary motion the ram will be raised, and in this movement of the ram it is guided by guide-rollers L, arranged on the frame C.

To cause the wheels $i$ to clutch the shank of the ram, I arrange a clutch-device, as follows:

The links $n$ connect with the shafts I and to a lever, N, which is pivoted, at $n'$, to the frame C. When the lever N is turned about its pivot $n'$, the links $n$, by their attachment, (as in fig. 4 shown,) are caused to draw the shafts I together, bringing the wheels $i$ in engagement with the ram, as required.

The lever N is raised by the links $o$, connecting with the piston O, of a steam-cylinder, P. This cylinder is arranged in the usual manner, and receives steam by a flexible pipe from a boiler without, so that the cylinder may freely travel with the frame C.

The operator, standing on the platform C', controls the admission of steam by a lever, $c$, which operates a valve in the steam-chest $p$.

Connected with this valve is a rod, $p^1$, having a curved tappet, $p^2$, which, when steam is passing into the cylinder, rests upon the hook $q$.

Said hook is pivoted, at $q^1$, to the platform C', and has a horizontal arm, $q^2$, extending out in the line of traverse of a prong, $k'$, at the rear of the ram K.

When the ram has risen to the proper height, the prong $k'$ trips the arm $q^2$, and releases the tappet $p^2$ from the hook $q$, and the valve drops to shut off steam, and thus the ram is no longer raised. Then, by the opening of the exhaust, the lever N is released, and the ram drops, by its gravity, upon the pile beneath.

The rod $p^1$ will be properly weighted, so that when released by the hook $q$, it will drop, to close the influent-valve, and open the steam-exhaust, as required. And in order that the hook $q$ will reset itself on the tappet $p^2$, its forward arm $q^2$ will be properly weighted; then, as the operator, by the levers $c$, raises the rod $p^1$, the hook $q$ simply falls into the tappet $p^2$.

A pile may be raised up and put into its position between the leaders B by attaching it to the platform C' and causing this to rise, as above described. Thus the entire work of setting and driving the pile is controlled by the operator upon the platform C'.

Lastly, it is plain that the stroke of the ram is regulated not only by the operator directly through the clutch-device N $n$ and the hand-lever $c$, but also by the height of the platform C' and frame C, above the pile, and that, in case a very great stroke is desired, the ram may be carried up, by the travelling frame C, to the top of the leader-frame.

Having thus fully described my invention,
What I claim, is—

1. The arrangement of a frame, C, and platform C', movable vertically, when said movement is controlled from the platform, substantially as set forth.

2. The ram, raised by friction-wheels $i$, substantially as set forth.

3. The lever N and links $n$, operating to clutch the wheels $i$ against the ram-shank, substantially as set forth.

HENRY FLAD.

Witnesses:
GEORGE P. HERTHEL, Jr.,
WILLIAM W. HERTHEL.